(12) United States Patent
Keller (10) Patent No.: US 10,420,330 B2
(45) Date of Patent: Sep. 24, 2019

(54) CONNECTING BRACKET AND A FRAME ASSEMBLY FOR CONSTRUCTING AN AQUARIUM

(71) Applicant: Adam John Keller, Fremont, WI (US)

(72) Inventor: Adam John Keller, Fremont, WI (US)

( * ) Notice: Subject to any disclaimer, the term of this patent is extended or adjusted under 35 U.S.C. 154(b) by 1023 days.

(21) Appl. No.: 14/876,433

(22) Filed: Oct. 6, 2015

(65) Prior Publication Data

US 2017/0094951 A1  Apr. 6, 2017

(51) Int. Cl.
| | | |
|---|---|---|
| *A01K 63/00* | (2017.01) | |
| *F16B 5/00* | (2006.01) | |
| *A47B 96/06* | (2006.01) | |
| *F16B 7/04* | (2006.01) | |

(52) U.S. Cl.
CPC .......... *A01K 63/003* (2013.01); *F16B 5/0004* (2013.01); *F16B 7/044* (2013.01)

(58) Field of Classification Search
CPC ...... F16B 5/0004; F16B 5/0012; F16B 7/044; A01K 63/003; F61M 13/02; F16M 13/025; F16M 11/04; F16M 11/041
USPC .................. 119/265; 248/220.21, 200, 309.1, 248/220.22, 221.11, 223.41
See application file for complete search history.

(56) References Cited

U.S. PATENT DOCUMENTS

| | | |
|---|---|---|
| 3,103,374 A | 9/1963 | Portnoy |
| 3,195,968 A | 7/1965 | Freeman |
| 3,711,133 A | 1/1973 | Werner |
| 3,854,831 A | 12/1974 | Gutner |
| 4,299,508 A | 11/1981 | Kerscher et al. |
| 4,323,319 A | 4/1982 | Adams |
| 4,368,998 A | 1/1983 | Pestoor |
| 4,516,376 A | 5/1985 | King |
| 4,709,897 A * | 12/1987 | Mooney .................. F16M 13/00 248/300 |
| 7,883,288 B2 * | 2/2011 | Jorna ..................... F16B 7/0453 403/171 |
| 8,979,047 B2 * | 3/2015 | Coyle ................... E04D 13/031 248/220.21 |
| 8,998,008 B1 * | 4/2015 | Robertson ............ A47B 96/022 108/42 |
| 9,272,811 B1 * | 3/2016 | Ranade .............. B65D 81/3816 |
| 10,165,906 B1 * | 1/2019 | Beychok ................. A61L 9/012 |
| 2009/0020669 A1 | 1/2009 | Wang |
| 2011/0017691 A1 | 1/2011 | Wu |
| 2011/0241502 A1 | 10/2011 | Kao |
| 2013/0008865 A1 | 1/2013 | Su |

OTHER PUBLICATIONS

Rocky Mountian, Quick Frame Technical Data, 2014, 3 pages, Westmill Industries, Canada.

* cited by examiner

*Primary Examiner* — Yvonne R Abbott-Lewis
(74) *Attorney, Agent, or Firm* — Thomas J. Connelly; Northwind IP Law, S.C.

(57) ABSTRACT

A connecting bracket is disclosed which includes a base having first and second edges aligned at an angle to one another. A first member extends up from the first edge and a second member extends up from the second edge. Each of the first and second members has an end wall. A first tongue projects outward from the end wall of the first member and a second tongue projects outward from the end wall of the second member. The first and second tongues are designed to engage two frame members. Three or more frame members can be joined together in this fashion to form a frame assembly. A pair of frame assemblies can be used to secure at least three sidewalls of a structure to form an aquarium.

20 Claims, 3 Drawing Sheets

CONNECTING BRACKET AND A FRAME ASSEMBLY FOR CONSTRUCTING AN AQUARIUM

FIELD OF THE INVENTION

This invention relates to a connecting bracket and a frame assembly for constructing an aquarium.

BACKGROUND OF THE INVENTION

Today, many variations of fish aquariums exist along with a few different configurations for cages or tanks that can accommodate amphibians, snakes and reptiles. Aquariums vary in size, shape, design, configuration and materials from which they are constructed. Unique polygonal shapes are particularly useful when space is limited, such as in the waiting room or reception areas of certain professional offices. A triangular shaped aquarium or a modified pentagonal shape aquarium fits well into a corner of a small waiting room. A hexagonal shaped aquarium works well when placed in the middle of a large waiting area, where the fish can be viewed from multiple sides, such as at the inside entrance to a library. In order to construct such unique shaped aquariums, one must form connecting brackets to very specific angles. A 90° connecting bracket works well for a square or rectangular shaped aquarium. However, three, five, six, seven and eight sided aquariums require connecting brackets having an angle other than 90°. Each polygonal shape requires a connecting bracket of a different angle. In addition, when one constructs an aquarium in the configuration of a polygon having unequal sides, a number of different angled connecting brackets are needed. Connecting brackets angled at 120° and 135° are needed to form a hexagonal and pentagonal shaped aquarium. Furthermore, aquariums seem to be getting bigger and larger. Sometimes, it is necessary to secure two frame members together at 180 degrees in order to obtain an adequate length for the frame assembly. In this case, a connecting bracket which will join the two frame members at 180° is needed.

Now, a connecting bracket, a frame assembly using connecting brackets, and an aquarium utilizing the frame assembly have been invented.

SUMMARY OF THE INVENTION

Briefly, this invention relates to a connecting bracket for securing first and second frame members together. A connecting bracket includes a base having a first edge aligned at an angle to a second edge. A first member extends upward from the first edge and a second member extends upward from the second edge. The first and second members are integrally formed with the base and with each other. Each of the first and second members has a bottom, a top, a pair of sides, and an end wall. A first tongue projects outward from the end wall of the first member and is integrally formed therewith. The first tongue has a top wall, a bottom wall and a pair of sidewalls substantially coincident with the top, bottom and pair of sides of the first member. The first tongue is capable of engaging with an end of the first frame member. A second tongue projects outward from the end wall of the second member and is integrally formed therewith. The second tongue has a top wall, a bottom wall and a pair of sidewalls substantially coincident with the top, bottom and pair of sides of the second member. The second tongue is capable of engaging an end of the second frame member. The connecting bracket thereby secures the first frame member to the second frame member.

The invention also relates to a frame assembly. The frame assembly includes at least three connecting brackets each having a base with a first edge aligned at an angle to a second edge. A first member extends upward from the first edge and a second member extends upward from the second edge. The first and second members are integrally formed with the base and with each other. Each of the first and second members has a bottom, a top, a pair of sides, and an end wall. A first tongue projects outward from the end wall of the first member and is integrally formed therewith. The first tongue has a top wall, a bottom wall and a pair of sidewalls substantially coincident with the top, bottom and pair of sides of the first member. The first tongue is capable of engaging a frame member. A second tongue projects outward from the end wall of the second member and is integrally formed therewith. The second tongue has a top wall, a bottom wall and a pair of sidewalls substantially coincident with the top, bottom and pair of sides of the second member. The second tongue is capable of engaging another frame member. The frame assembly also includes at least three frame members each having a top wall joined to a bottom wall by a sidewall. Each of the frame members also having a first wall joined to the top wall and a second wall joined to the bottom wall. The first and second walls are spaced apart from the sidewall and aligned parallel thereto. The first wall extends toward the bottom wall and the second wall extends toward the top wall. The first and second walls cooperate with the adjacent sidewall to form a pair of channels sized to receive one of the first and second tongues of one of the connecting brackets.

The invention further relates to an aquarium. The aquarium has a bottom wall, a top wall, and at least three sidewalls joining the bottom wall to the top wall. The aquarium also has first and second frame assemblies. The first frame assembly is positioned adjacent to the top wall and the second frame assembly is positioned adjacent to the top wall. Each of the frame assemblies has at least three connecting brackets. Each connecting bracket has a base with a first edge aligned at an angle to a second edge. A first member extends upward from the first edge and a second member extends upward from the second edge. The first and second members are integrally formed with the base and with each other. Each of the first and second members has a bottom, a top, a pair of sides, and an end wall. A first tongue projects outward from the end wall of the first member and is integrally formed therewith. The first tongue has a top wall, a bottom wall and a pair of sidewalls substantially coincident with the top, bottom and pair of sides of the first member. The first tongue is capable of engaging a first frame member. A second tongue projects outward from the end wall of the second member and is integrally formed therewith. The second tongue has a top wall, a bottom wall and a pair of sidewalls substantially coincident with the top, bottom and pair of sides of the second member. The second tongue is capable of engaging a second frame member. Each frame assembly also includes at least three frame members. Each frame member has a top wall and a bottom wall joined by a sidewall. Each of the frame members also has a first wall and a second wall spaced apart from the sidewall and aligned parallel thereto. The first wall is joined to the top wall and extends toward the bottom wall and the second wall is joined to the bottom wall and extends toward the top wall. The first and second walls cooperate with the adjacent sidewall to form a pair of channels sized to receive one of the first and second tongues of one of the connecting brackets. The connecting bracket and frame members cooperate with the bottom wall, the top wall and the sidewalls to for an aquarium.

The general object of this invention is to provide a connecting bracket, a frame assembly using connecting brackets, and an aquarium utilizing the frame assembly. A more specific object of this invention is to provide a connecting bracket that can join two frame members at an angle of from between about 1 degree to 180 degrees.

Another object of this invention is to provide a connecting bracket which can be used to construct a frame assembly where two frame members are aligned at an obtuse angle.

A further object of this invention is to provide a frame assembly which utilizes at least three connecting brackets.

Still another object of this invention is to provide a frame assembly which is used to construct polygonal shaped aquariums.

Still further, an object of this invention is to provide an economical frame assembly.

Other objects and advantages of the present invention will become more apparent to those skilled in the art in view of the following description and the accompanying drawings.

DETAILED DESCRIPTION OF THE INVENTION

Figure 2:
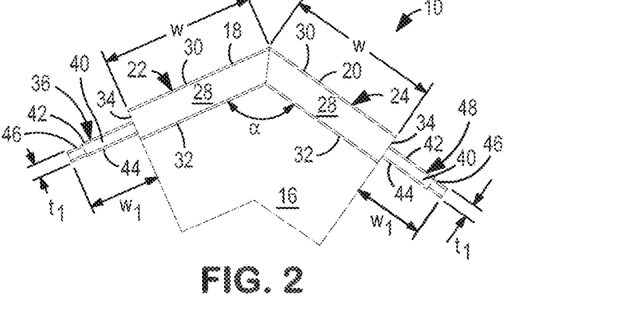
FIG. 2 is a top view of the connecting bracket shown in FIG. 1.
Figure 3:
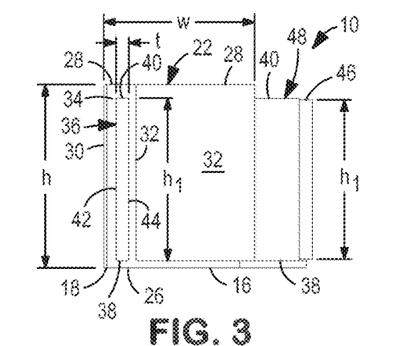
FIG. 3 is a side view of the connecting bracket shown in FIG. 1.
Figure 4:
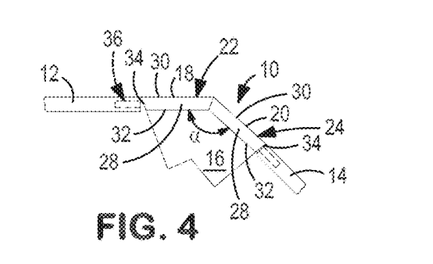
FIG. 4 is a top view showing the connecting bracket securing two frame members together.

Referring to FIGS. 1-4, a connecting bracket 10 is shown for securing together a first frame member 12 and a second frame member, see FIG. 4. The first and second frame members, 12 and 14 respectively, can be identical in design, length and construction or they could be different. The first and second frame members, 12 and 14 respectively, can be of the same length or they can be different. The first and second frame members, 12 and 14 respectively, can be formed from various materials. For example, the first and second frame members, 12 and 14 respectively, could be constructed from aluminum, plastic, a thermoplastic, wood, metal, a metal alloy, steel, a steel alloy, a composite material, fiberglass, etc.

Still referring to FIGS. 1-4, the connecting bracket 10 can vary in size, shape and material from which it is constructed. The connecting bracket 10 can be formed by injection molding, by 3-D printing, be cast, be machined, be assembled, etc. The connecting bracket 10 can be formed from plastic, thermoplastics, nylon or any other material known to those skilled in the art that can be formed or shaped, such as by injection molding, 3-D printing, casting, machining, etc.

The connecting bracket 10 includes a base 16 having a first edge 18 aligned at an angle alpha ($\alpha$) to a second edge 20, see FIGS. 2-4. The edges 18 and 20 can be any geometrical shape including but not limited to: linear, curved, arcuate, zigzag, etc. The angle alpha ($\alpha$) can vary. The angle alpha ($\alpha$) can range from between about 1° to 180°. The angle alpha ($\alpha$) can be an acute angle, a right angle or an obtuse angle. By "acute" it is meant an angle of less than 90 degrees. By "obtuse" it is meant an angle between 90 degrees and 180 degrees. Desirably, the angle alpha ($\alpha$) ranges from between about 90° to about 170'. More desirably, the angle alpha ($\alpha$) ranges from between about 110° to about 150°. When the connecting bracket 10 is used to construct an aquarium having 3, 5, 6, 7, 8 etc. sides, such as a polygon or a modified polygonal shape, the angle alpha ($\alpha$) will vary. Common angles include but are not limited to: 60°, 75°, 90°, 120°, 135° and 150°.

The connecting bracket 10 can also be used to secure the first and second frame members, 12 and 14 respectively, in a straight line at 180°. In this case, the connecting bracket 10 acts as a connector instead of an angled bracket.

The connecting bracket 10 also includes a first member 22 extending upward from the first edge 18 and a second member 24 extending upward from the second edge 20. The first and second members, 22 and 24 respectively, are integrally formed with the base 16 and with each other. Each of the first and second members, 22 and 24 respectively, has a bottom 26, a top 28, a pair of sides 30 and 32 and an end wall 34.

Referring to FIGS. 2 and 3, the first and second members, 22 and 24 respectively, have a height h and a width w. The height h and the width w can vary. Generally, the height h and the width w of the first and second members, 22 and 24 respectively, are the same although they can be different. The height h of the first and second members, 22 and 24 respectively, can range from between about 1 inch to about 5 inches. Desirably, the height h of the first and second members, 22 and 24 respectively, can range from between about 1.25 inches to about 3 inches. More desirably, the height h of the first and second members, 22 and 24 respectively, can range from between about 1.3 inches to about 2 inches. Even more desirably, the height h of the first and second members, 22 and 24 respectively, is about 1.5 inches.

The width w of the first and second members, 22 and 24 respectively, can range from between about 1 inch to about 5 inches. Desirably, the width w of the first and second members, 22 and 24 respectively, can range from between about 1.25 inches to about 3 inches. More desirably, the width w of the first and second members, 22 and 24 respectively, can range from between about 1.3 inches to about 2 inches. Even more desirably, the width w of the first and second members, 22 and 24 respectively, is about 1.5 inches.

It should be understood that as the angle alpha (α) gets larger; the height h and the width w dimensions of the first and second members 22 and 24 respectively, can also increase in some instances.

Referring again to FIGS. 1-4, the connecting bracket 10 further includes a first tongue 36 projecting outward from the end wall 34 of the first member 22. The first tongue 36 is integrally formed with the first member 22. The first tongue 36 has a bottom wall 38, a top wall 40, and a pair of sidewalls 42 and 44 substantially coincident with the bottom 26, top 28, and pair of sides 30 and 32 of the first member 22. By "substantially coincident" it is meant being similar but not of the exact same dimensions, slightly smaller in dimension. The first tongue 36 is capable of engaging the first frame member 12.

Referring now to FIGS. 2 and 3, the first tongue 36 has a height $h_1$, a width $w_1$ and a thickness $t_1$. The height $h_1$ of the first tongue 36 is measured parallel to the height h of the first and second members, 22 and 24 respectively. The height $h_1$ of the first tongue 36 can vary. The height $h_1$ of the first tongue 36 is slightly smaller than the height h of the first member 22 or the second member 24. Desirably, the height $h_1$ of the first tongue 36 is within about 0.25 inches of the height h of either of the first or second members, 22 or 24 respectively.

Referring again to FIG. 2, the width $w_1$ of the first tongue 36 is measured parallel to the first edge 18. The width $w_1$ of the first tongue 36 can vary. The width $w_1$ of the first tongue 36 can range from between about 0.05 inches to about 1 inch depending on the overall size of the connecting bracket 10. Desirably, the width $w_1$ of the first tongue 36 can range from between about 0.1 inches to about 0.5 inches. More desirably, the width $w_1$ of the first tongue 36 can range from between about 0.15 inches to about 0.4 inches. Even more desirably, the width w of the first tongue 36 can range from between about 0.15 inches to about 0.3 inches. Most desirably, the width $w_1$ of the first tongue 36 is at least about 0.25 inches when the first and second members, 22 and 24 respectively, have a height h of about 1.5 inches.

Still referring to FIG. 2, the first tongue 36 also has a thickness $t_1$ measured perpendicular to the first edge 18. The thickness $t_1$ of the first tongue 36 can vary. The thickness $t_1$ of the first tongue 36 can range from between about 0.01 inches to about 0.25 inches. Desirably, the thickness $t_1$ of the first tongue 36 can range from between about 0.02 inches to about 0.2 inches. More desirably, the thickness $t_1$ of the first tongue 36 can range from between about 0.05 inches to about 0.2 inches. Even more desirably, the thickness $t_1$ of the first tongue 36 can range from between about 0.07 inches to about 0.15 inches. Most desirably, the thickness $t_1$ of the first tongue 36 is at least about 0.1 inches when the first and second members, 22 and 24 respectively, have a height h of about 1.5 inches.

Figure 1:
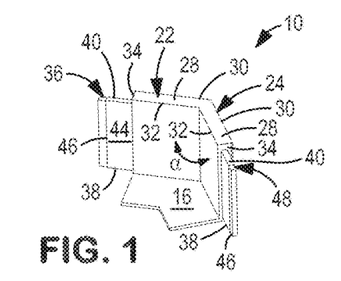
FIG. 1 is a perspective view of a connecting bracket having an angle of 120°.

Referring again to FIGS. 1 and 2, the first tongue 36 can be constructed to have a reduced overall size at a location farthest away from the end wall 34 of the first member 22. This smaller overall size can be produced by employing a step down configuration or taper 46 near the outer most portion of the first tongue 36. A step down configuration 46 is shown in FIGS. 1 and 2. The step down configuration or taper 46 can be slight. The step down configuration or taper 46 facilitates engagement of the first tongue 36 into the first frame member 12.

Referring again to FIGS. 1-4, the connecting bracket 10 also includes a second tongue 48 projecting outward from the end wall 34 of the second member 24 and being integrally formed therewith. Since the second tongue 48 is identical in configuration to the first tongue 36, for simplicity purpose, the structure of the second tongue 48 will use the same numbers and letters as those used to describe the first tongue 36. The second tongue 48 has a bottom wall 38, a top wall 40 and a pair of sidewalls 42 and 44 substantially coincident with the bottom 26, the top 28 and pair of sides 30 and 32 of the second member 24. The second tongue 48 is capable of engaging the second frame member 14. The second tongue 48 can be of the same size as the first tongue 36.

Referring now to FIGS. 2 and 3, the second tongue 48 has a height $h_1$, a width $w_1$ and a thickness $t_1$. The height $h_1$ of the second tongue 48 is measured parallel to the height h of the first and second members, 22 and 24 respectively. The height $h_1$ of the second tongue 48 can vary. The height $h_1$ of the second tongue 48 is slightly smaller than the height h of the first member 22 or the second member 24. Desirably, the height $h_1$ of the second tongue 48 is within about 0.25 inches of the height h of either of the first or second members, 22 or 24 respectively.

Referring to FIG. 2, the width $w_1$ of the second tongue 48 is measured parallel to the second edge 20. The width $w_1$ of the second tongue 48 can vary. The width $w_1$ of the second tongue 48 can range from between about 0.05 inches to about 1 inch depending on the overall size of the connecting bracket 10. Desirably, the width $w_1$ of the second tongue 48 can range from between about 0.1 inches to about 0.5 inches. More desirably, the width $w_1$ of the second tongue 48 can range from between about 0.15 inches to about 0.4 inches. Even more desirably, the width $w_1$ of the second tongue 48 can range from between about 0.15 inches to about 0.3 inches. Most desirably, the width $w_1$ of the second tongue 48 is at least about 0.25 inches when the first and second members, 22 and 24 respectively, have a height h of about 1.5 inches.

Still referring to FIG. 2, the second tongue 48 also has a thickness $t_1$ measured perpendicular to the second edge 20. The thickness $t_1$ of the second tongue 48 can vary. The thickness $t_1$ of the second tongue 48 can range from between about 0.01 inches to about 0.25 inches. Desirably, the thickness $t_1$ of the second tongue 48 can range from between about 0.02 inches to about 0.2 inches. More desirably, the thickness $t_1$ of the second tongue 48 can range from between about 0.05 inches to about 0.2 inches. Even more desirably, the thickness $t_1$ of the second tongue 48 can range from between about 0.07 inches to about 0.15 inches. Most desirably, the thickness $t_1$ of the second tongue 48 is at least about 0.1 inches when the first and second members, 22 and 24 respectively, have a height h of about 1.5 inches.

Referring again to FIGS. 1 and 2, the second tongue 48 can be constructed to have a reduced overall size at a location farthest away from the end wall 34 of the second member 24. This smaller overall size can be produced by a step down configuration or taper 46. A step down configuration is shown in FIGS. 1 and 2. The step down configuration or taper 46 can be slight. The step down configuration or taper 46 facilitates engagement of the second tongue 48 into the second frame member 14.

The connecting bracket 10 can be constructed from various materials known to those skilled in the art. For example, the connecting bracket 10 can be constructed from aluminum, plastic, a thermoplastic, a composite material, fiberglass, nylon, a metal, a metal alloy, steel, a steel alloy, wood, etc. By "nylon" it is meant any of a family of high strength, resilient synthetic polymers containing recurring amide groups. The size of the connecting bracket 10 can also vary. For example, if the connecting bracket 10 is used to construct a small frame assembly, it can be relatively, small in size. If the connecting bracket 10 is to be used to construct a large frame assembly, it should be larger in size and capable of handling heavier loads. Furthermore, the overall shape and color of the connecting bracket 10 can vary to suit one's particular needs.

The connecting bracket 10 can be formed or constructed in various ways known to those skilled in the art. For example, the connecting bracket 10 can be injection molded, formed on a 3-dimensional printer (3D), be cast in a mold, be machined, be carved out of wood, etc. Desirably, the connecting bracket 10 is injection molded. However, with the current advancement in 3D printing technology, it may be possible to print the connecting bracket 10 in an efficient and economical manner. If the connecting bracket 10 can be constructed as a single integral member, the cost can be reduced and there will be no assembly charge. In addition, less manual labor may be needed to fabricate the connecting bracket 10.

Figure 5:
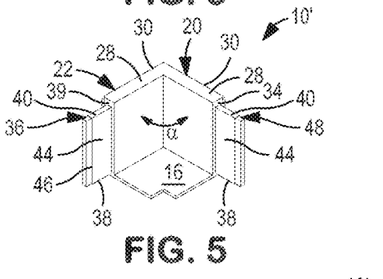
FIG. 5 is a perspective view of a connecting bracket having an angle of 90°.
Figure 6:
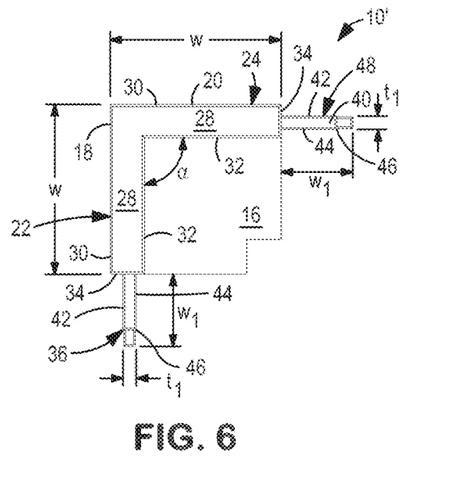
FIG. 6 is a top view of the connecting bracket shown in FIG. 5.
Figure 7:
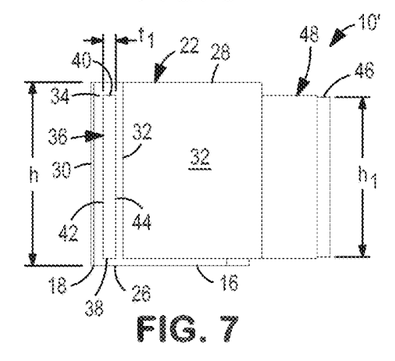
FIG. 7 is a side view of the connecting bracket shown in FIG. 5.

Referring now to FIGS. 5-7, another embodiment of a connecting bracket 10' is shown. The connecting bracket 10' differs from the connecting bracket 10 in that the angle alpha ($\alpha$) is 90°. This is the only difference.

It should be understood that the connecting brackets 10 or 10' can be constructed to any desired angle.

Referring now to FIGS. 8-11, a frame member 12 is shown along with two connecting brackets 10, 10. The frame member 12, as well as the frame member 14 shown in FIG. 2, can vary in size, shape, length and material from which they are constructed. The frame members 12 and 14 are identical in appearance, so only the frame member 12 will be described. The frame member 12 is depicted as an elongated linear member having a length $l_2$. The length $l_2$ of the frame member 12 can be made or cut to any desired dimension. The frame member 12 could also have a non-linear shape. The frame member 12 could be curved, arcuate or have some other geometrical shape. The frame member 12 has a height $h_2$ and a width $w_2$. The height $h_2$ and width $w_2$ of the frame member 12 can vary. The physical dimensions of the frame member 12 can be adjusted to suit one's particular needs. Typically, the height $h_2$ of the frame member 12 is greater than the width $w_2$ of the frame member 12, although both can be equal size, if desired. The height $h_2$ of the frame member 12 normally ranges from between about 0.25 inches to about 3 inches. Desirably, the height $h_2$ of the frame member 12 is about 2.5 inches or less. More desirably, the height $h_2$ of the frame member 12 is about 2 inches or less. Even more desirably, the height $h_2$ of the frame member 12 is about 1.5 inches or less. Most desirably, the height $h_2$ of the frame member 12 is about 1 inch.

The width $w_2$ the frame member 12 normally ranges from between about 0.25 inches to about 2 inches. Desirably, the width $w_2$ of the frame member 12 is about 1.75 inches or less. More desirably, the width $w_2$ of the frame member 12 is about 1.5 inches or less. Even more desirably, the width $w_2$ of the frame member 12 is about 1.25 inches or less. Most desirably, the width $w_2$ of the frame member 12 is about 1 inch.

Figure 11:
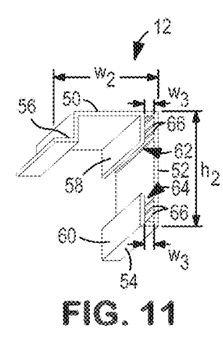
FIG. 11 is a perspective view of the frame member shown in FIG. 9 turned 180°.

Referring to FIG. 11, the frame member 12 has a top wall 50, a sidewall 52 and a bottom wall 54 all joined together. Desirably, the top wall 50, the sidewall 52 and the bottom wall 54 are integrally formed. The top wall 50 can contain a step 56. The step 56 is only needed when the frame member 12 is going to be used as an upper rail in a frame assembly for a structure, such as an aquarium. The step 56 provides a platform to support a piece of glass, PLEXIGLAS, a sheet of acrylic, or some other transparent material or a non-transparent material which will cover the top surface of the structure. PLEXIGLAS is a registered trademark of Rohm and Hass Company having an office at Independence Mall, West Philadelphia, Pa. 19105. PLEXIGLAS® is a light transparent, weather-resistant thermoplastic. By "a sheet of acrylic" it is meant a sheet formed from acrylic resin.

Still referring to FIG. 11, the frame member 12 also has a first wall 58 and a second wall 60 spaced apart from the adjacent sidewall 52. The first and second walls, 58 and 60 respectively, are aligned parallel to the adjacent sidewall 52. The first and second walls, 58 and 60 respectively, are coaxially aligned with one another. The first wall 58 is joined to the top wall 50 and extends downward toward the bottom wall 54. The second wall 60 is joined to the bottom wall 54 and extends upward toward the top wall 50. The first and second walls, 58 and 60 respectively, are spaced vertically apart from one another. However, the first and second walls, 58 and 60 respectively, could be formed as one continuous wall, if desired. The first and second walls, 58 and 60 respectively, cooperate with the adjacent sidewall 52 to form a pair of channels 62 and 64. The channels 62 and 64 are sized to receive one of the first and second tongues, 36 and 48 respectively, of one of the connecting brackets 10, 10. Each of the channels 62 and 64 has a width $w_3$ which can vary in dimension. The width $w_3$ of each of the channels 62 and 64 should be slightly less than the thickness $t_1$ of the first or second tongues, 36 or 48 respectively. The width $w_3$ of each of the channels 62 and 64 can be from about 0.01 inches to about 0.1 inches smaller than the thickness $t_1$ of the first or second tongues, 36 or 48 respectively.

Figure 8:
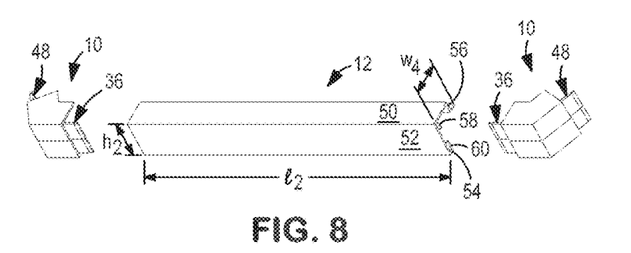
FIG. 8 is an exploded view of a frame member and a pair of connecting brackets.
Figure 9:
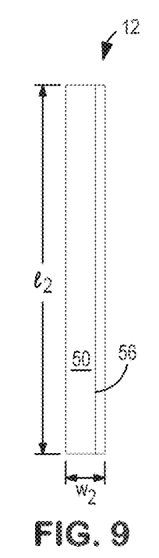
FIG. 9 is a top view of an upper frame member.
Figure 10:
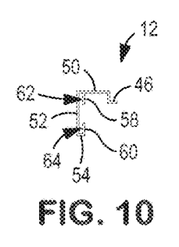
FIG. 10 is a cross-sectional view of the frame member shown in FIG. 9.

In FIG. 8, the first tongue 36 of each of the two connecting brackets 10, 10 will engage with the opposite ends of the frame member 12.

Still referring to FIG. 11, one will notice that each of the channels 62 and 64 contains a plurality of ribs 66. The ribs 66 are spaced apart from one another. The ribs 66 can vary in size and configuration. For example, each of the plurality of ribs 66 can have a triangular shape with a pointed apex or a rounded apex. The plurality of ribs 66 are small in dimension and each rib 66 extends parallel to the length $l_2$ of the frame member 12. The plurality of ribs 66 are designed to contact either of the first or second tongues, 36 or 48 respectively, and facilitate the connection therewith. The plurality of ribs 66 provide interference and bite into the first or second tongues, 36 or 48 respectively, and function to hold the tongue 36 or 48 tight in the channels 62 and 64. The channels 62 and 64 are sized to provide an interference fit with the first or second tongue, 36 or 48 respectively. As mentioned above, the first and second tongues, 36 and 48 respectively, can have a step down configuration or taper 46 which will facilitate entrance of the first and second tongues, 36 and 48 respectively, into the channels 62 and 64. A mallet can then be used to hammer the connecting bracket 10 into the frame member 12 such that the two members 10 and 12 are securely locked together. A secure attachment is formed in this way to obtain a frame assembly 68.

It should be understood that no glue or adhesive is needed to form the secure attachment between one of the first and second tongues, 36 and 48 respectively, and the ends of the frame member 12. However, one could apply glue or an adhesive to the channels 62 and 64 or to at least a portion of the exterior surface of the first or second tongues, 36 and 48 respectively, if desired. Any kind or type of glue or adhesive could be used. One kind of adhesive that can be used is an expandable adhesive such as GORILLA GLUE. GORILLA GLUE is a registered trademark of Gorilla Glue Company having an office at 4550 Red Bank Expressway, Cincinnati, Ohio 45227.

Figure 12:
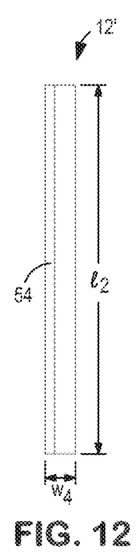
FIG. 12 is a top view of a lower frame member.
Figure 13:
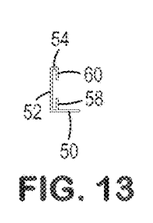
FIG. 13 is a cross-sectional view of the frame member shown in FIG. 12.

Referring now to FIGS. 12 and 13, an alternative embodiment of a frame member 12' is shown. The frame member 12' is used to form a frame assembly 68' for the bottom edge of a structure, such as an aquarium. Therefore, the frame assembly 68' is inverted 180° relative to the frame member 12. The frame member 12' differs from the frame member 12 in that it does not contain the step 56. Because of this, the frame member 12' has a width $w_4$ which is slightly less than the width $w_3$ of the frame member 12. Since the frame member 12' is used as part of the bottom frame assembly 68', it does not have to have the step 56 to support a piece of glass, PLEXIGLAS, a sheet of acrylic, or some other kind of transparent or non-transparent material.

Figure 14:
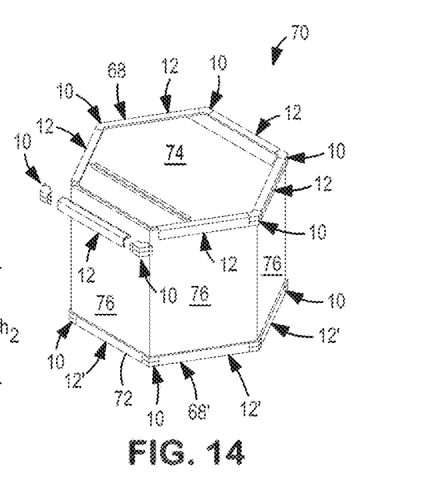
FIG. 14 is a partially exploded perspective view of a hexagonal shaped aquarium.

Referring now to FIG. 14, the frame assembly 68 and the frame assembly 68' are shown being used to construct an aquarium 70. The aquarium 70 is depicted as having a hexagonal cross-sectional shape. It should be understood that the cross-section of the aquarium 70 could be any desired shape. The aquarium 70 could have a cross-section in the shape of a triangle, a square, a rectangle, a polygon, a modified polygon, a circle, etc.

Each of the frame assemblies 68 and 68' include at least three connecting brackets 10, 10 and 10. Six connecting brackets 10, 10, 10, 10, 10 and 10 are used to construct the frame assembly 68 used in the hexagonal shaped aquarium 70. Six additional connecting brackets 10, 10, 10, 10, 10 and 10 are used to construct the frame assembly 68' used in the hexagonal shaped aquarium 70.

Referring back to FIGS. 1-5, each connecting bracket 10, 10 and 10 includes a base 16 with a first edge 18 aligned at an angle to a second edge 20, A first member 22 extends upward from the first edge 18 and a second member 24 extends upward from the second edge 20. The first and second members, 22 and 24 respectively, are integrally formed with the base 16 and with each other. Each of the first and second members, 22 and 24 respectively, has a bottom 26, a top 28, a pair of sides 30 and 32, and an end wall 34. A first tongue 36 projects outward from the end wall 34 of the first member 22 and is integrally formed therewith. The first tongue 36 has a bottom wall 38, a top wall 40, and a pair of sidewalls 42 and 44, substantially coincident with the bottom 26, the top 28, and the pair of sides 30 and 32, of the first member 22, The first tongue 36 is capable of engaging an end of the frame member 12. A second tongue 48 projects outward from the end wall 34 of the second member 24 and is integrally formed therewith. The second tongue 48 has a bottom wall 38, a top wall 40, and a pair of sidewalls 42 and 44, substantially coincident with the bottom 26, the top 28 and the pair of sides 30 and 32, of the second member 24. The second tongue 48 is capable of engaging another frame member 12.

The frame assembly 68 also includes at least three frame members 12, 12 and 12. Six frame members 12, 12, 12, 12, 12, and 12 are used to construct the frame assembly 68 of the hexagonal shaped aquarium 70. Six of the frame members 12', 12', 12', 12', 12', and 12' are used to construct the frame assembly 68' of the hexagonal shaped aquarium 70.

Referring again to FIGS. 8-13, each of the frame members 12 and 12' has a top wall 50 joined by a sidewall 52 to a bottom wall 54, Each of the frame members 12 and 12' has a first wall 58 joined to the top wall 50 and a second wall 60 joined to the bottom wall 54. The first and second walls, 58 and 60 respectively, are spaced apart from the adjacent sidewall 52 and are aligned parallel thereto. The first wall 58 is vertically spaced apart from the second wall 60 and the first and second walls, 58 and 60 respectively, are coaxially aligned with one another. The first wall 58 extends toward the bottom wall 54 and the second wall 60 extends toward the top wall 50. The first wall 58 does not contact the second wall 60 but could, if desired. The first and second walls, 58 and 60 respectively, cooperate with the adjacent sidewall 52 to form a pair of channels 62 and 64 sized to receive one of the first and second tongues, 36 and 48 respectively, of one of the connecting brackets 10 or 10'.

The number of frame members 12 or 12' that are present will depend on the configuration of the structure of the aquarium 70. When the aquarium 70 has a triangular shape, three of the upper frame members 12 are present and three of the lower frame members 12' are present. When the aquarium 70 has a pentagon shape, five of the upper frame members 12 are present and five of the lower frame members 12' are present. For an aquarium 70 having a hexagonal shape, six of the upper frame members 12 are present and six of the lower frame members 12' are present. When the aquarium 70 is a polygon having at least five sides, at least five of the upper frame members 12 and at least five of the lower frame members 12' are needed.

As mentioned above, the frame members 12, 12' and 14 can be formed from various materials. Such materials include but are not limited to: aluminum, plastic, a thermoplastic, fiberglass, a composite material, wood, metal, a metal alloy, steel, a steel alloy, etc.

Figure 15:
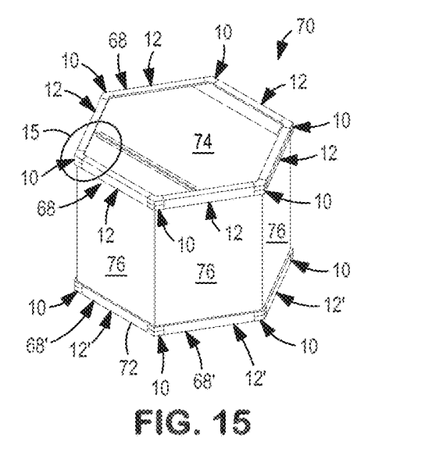
FIG. 15 is a perspective view of the aquarium shown in FIG. 14.

Referring now to FIGS. 14 and 15, the aquarium 70 is shown. The aquarium 70 can vary in size and shape. The aquarium 70 can be constructed out of various materials, including but not limited to: wood, metal, a metal alloy, plastic, a thermoplastic, a composite material, fiberglass, glass, clear glass, tinted glass, PLEXIGLAS, a sheet of acrylic, a transparent material, a non-transparent material, a solid material, etc. It is also possible to utilize a metal mesh, a wire mesh, a screen, etc. for a portion of the aquarium 70, such as for the top wall.

It should be understood that the aquarium 70 is shown as a hexagonal cube. However, the aquarium 70 could be constructed with three or more upstanding sides 76, 76 and 76. The aquarium 70 could have any imaginable geometrically shape. For example, the aquarium 70 could be a polygon. Likewise, the aquarium 70 could have a round or circular cross-section, a triangular cross-section, a square cross-section, a rectangular cross-section, a pentagon cross-section, an octagon cross-section, etc.

Still referring to FIGS. 14 and 15, the aquarium 70 includes a bottom wall 72, a top wall 74, and at least three sidewalls 76, 76 and 76 joining the bottom wall 72 to the top wall 74. Six sidewalls 76, 76, 76, 76, 76 and 76 are shown in FIGS. 14 and 15. The aquarium 70 also includes first and second frame assemblies, 68 and 68' respectively. The first frame assembly 68 is positioned adjacent to the top wall 74 and the second frame assembly 68' is positioned adjacent to the bottom wall 72. Each of the frame assemblies 68 and 68' has at least three connecting brackets 10, 10 and 10. Six connecting brackets 10, 10, 10, 10, 10 and 10 are present in the first frame assembly 68 and six connecting brackets 10, 10, 10, 10, 10, and 10 are present in the second frame assembly 68'. Each of the connecting brackets 10 has a base 16 with a first edge 18 aligned at an angle to a second edge 20. A first member 22 extends upward from the first edge 18 and a second member 24 extends upward from the second edge 20. The first and second members, 22 and 24 respectively, are integrally formed with the base 16 and with each other. Each of the first and second members, 22 and 24 respectively, has a bottom 26, a top 28, a pair of sides 30 and 32, and an end wall 34. A first tongue 36 projects outward from the end wall 34 of the first member 22 and is integrally formed therewith. The first tongue 36 has a bottom wall 38, a top wall 40, and a pair of sidewalls 42 and 44 substantially coincident with the bottom 26, the top 28, and the pair of sides 30 and 32, of the first member 22. The first tongue 36 is capable of engaging a first frame member 12. A second tongue 48 projects outward from the end wall 34 of the second member 24 and is integrally formed therewith. The second tongue 48 has a bottom wall 38, a top wall 40, and a pair of sidewalls 42 and 44 substantially coincident with the bottom 26, the top 28, and the pair of sides 30 and 32, of the second member 24. The second tongue 48 is capable of engaging a second frame member 14. The frame assemblies 68 and 68' also include at least three frame members 12, 12, 12, each having a top wall 50, a sidewall 52 and a bottom wall 54 are all joined together. A first wall 58 and a second wall 60 are spaced apart from the adjacent sidewall 52 and are aligned parallel thereto. The first wall 58 is joined to the top wall 50 and extends toward the bottom wall 54 and the second wall 60 is joined to the bottom wall 54 and extends toward the top wall 50. The first and second walls, 58 and 60 respectively, cooperate with the adjacent sidewall 52 to form a pair of channels 62 and 64. The pair of channels 62 and 64 is sized to receive one of the first and second tongues, 36 and 48 respectively, of one of the connecting brackets 10.

Figure 16:
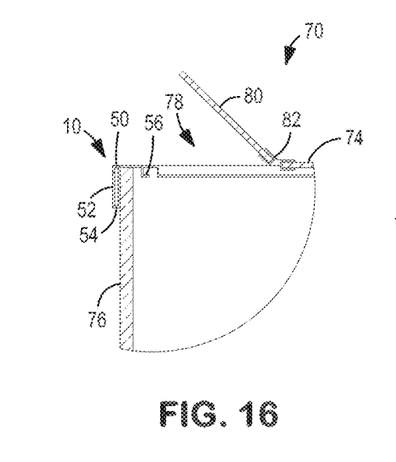
FIG. 16 is a cross-sectional view of an upper corner of the aquarium shown in FIG. 15.

Referring now to FIG. 16, a portion of the top wall 74 of the aquarium 70 is shown having an opening 78 formed therein. The opening 78 can vary in size and shape and can function to provide access to the inside of the aquarium 70. The opening 78 is closed by a door 80 attached to the top wall 74 by a hinge 82. The hinge 82 allows the door 80 to pivot between an open position and a closed position. The door 80 can be constructed from various materials. The door 80 could be a solid material with no openings. For example, the door 80 could be constructed from glass, PLEXIGLAS, a sheet of acrylic, a transparent material, a non-transparent material, wood, metal, a metal alloy, plastic, a thermoplastic, fiberglass, a composite material or any other material known to man. Alternatively, the door 80 could contain a plurality of openings. For example, the door 80 could be constructed of a metal mesh, a wire mesh, a screen, fine netting, cloth, such as cheese cloth, etc. Sometimes, it is desirable to construct the door 80 with a plurality of small openings to allow air to circulate through the aquarium 70.

The door 80 used to closed the opening 78 can vary in size, shape and construction. The door 80 can be a movable door, a sliding door, a door that pivots, a door that is vertically lifted to be removed, etc. Likewise, the hinge 82 could also vary in size, design and construction. The hinge 82 could further be replaced by some other mechanism, known to those skilled in the art, which will allow the door 80 to be moved from an open position to a closed position or to be completely removed from the top wall 74.

Figure 17:
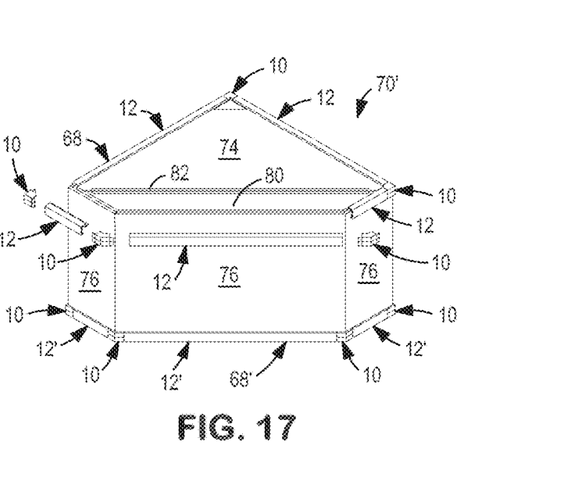
FIG. 17 is a partially exploded perspective view of a modified pentagonal shaped aquarium.
Figure 18:
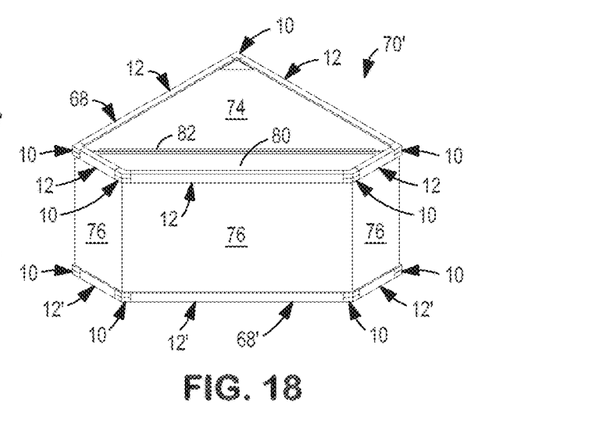
FIG. 18 is a perspective view of the aquarium shown in FIG. 17.

Referring to FIGS. 17 and 18, an alternative embodiment of an aquarium 70' is shown having a modified pentagon shape. The aquarium 70' is a polygon with five sidewalls 76, 76, 76, 76 and 76. In this case, each of the frame assemblies 68 and 68' include five connecting brackets 10, 10, 10, 10 and 10. The upper frame assembly 68 includes five frame members 12, 12, 12, 12 and 12 and the lower frame assembly 68' includes five frame members 12', 12', 12', 12' and 12'.

It should be understood that some of the connecting brackets 10 shown in FIGS. 17 and 18 will be constructed to a different angle alpha (α) than some of the other connecting brackets 10.

Figure 19:
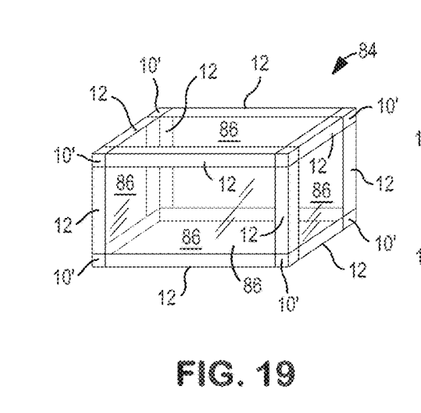
FIG. 19 is a perspective view of a rectangular aquarium.

Lastly, referring to FIG. 19, an aquarium 84 is shown having a rectangular configuration. The aquarium 84 is constructed using eight corner brackets 10' and twelve frame members 12, Five pieces of glass 86 are secured to the corner brackets 10' and the frame members 12 to form the bottom and four sides. The top is open. The pieces of glass 86 could be replaced with pieces of Plexiglas, acrylic or some other material.

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A connecting bracket for securing a first frame members and a second frame member together, comprising:
   a) a base having a first edge aligned at an angle to a second edge, a first member extending upward from said first edge and a second member extending upward from said second edge, said first and second members being integrally formed with said base and with each other, and each of said first and second members having a bottom, a top, a pair of sides and an end wall;
   b) a first tongue projecting outward from said end wall of said first member and being integrally formed therewith, said first tongue having a bottom wall, a top wall and a pair of sidewalls substantially coincident with said bottom, top and pair of sides of said first member, and said first tongue capable of engaging said first frame member; and
   c) a second tongue projecting outward from said end wall of said second member and being integrally formed therewith, said second tongue having a bottom wall, a top wall and a pair of sidewalls substantially coincident with said bottom, top and pair of sides of said second member, and said second tongue capable of engaging said second frame member.

2. The connecting bracket of claim 1 wherein said angle ranges from between about 1 degree to 180 degrees.

3. The connecting bracket of claim 1 wherein said angle ranges from between about 90 degree to about 170 degrees.

4. The connecting bracket of claim 3 wherein said angle ranges from between about 110 degree to about 150 degrees.

5. The connecting bracket of claim 1 wherein said connecting bracket is constructed from nylon.

6. The connecting bracket of claim 1 wherein said first tongue has a width, measured parallel to said first edge, of at least about 0.25 inches.

7. The connecting bracket of claim 1 wherein said second tongue has a width, measured parallel to said second edge, of at least about 0.25 inches.

8. The connecting bracket of claim 1 wherein said first tongue has a thickness, measured perpendicular to said first edge, of at least about 0.10 inches.

9. The connecting bracket of claim 1 wherein said second tongue has a thickness, measured perpendicular to said second edge, of at least about 0.10 inches.

10. A frame assembly comprising:
 a) at least three connecting brackets each having a base with a first edge aligned at an angle to a second edge, a first member extending upward from said first edge and a second member extending upward from said second edge, said first and second members being integrally formed with said base and with each other, and each of said first and second members having a bottom, a top, a pair of sides and an end wall, a first tongue projecting outward from said end wall of said first member and being integrally formed therewith, said first tongue having a bottom wall, a top wall and a pair of sidewalls substantially coincident with said bottom, top and pair of sides of said first member, and said first tongue capable of engaging a frame member, and a second tongue projecting outward from said end wall of said second member and being integrally formed therewith, said second tongue having a bottom wall, a top wall and a pair of sidewalls substantially coincident with said bottom, top and pair of sides of said second member, and said second tongue capable of engaging another frame member; and
 b) at least three frame members each having a top wall joined by a sidewall to a bottom wall, and each having a first wall joined to said top wall and a second wall joined to said bottom wall, said first and second walls being spaced apart from said sidewall and aligned parallel thereto, said first wall extending toward said bottom wall and said second wall extending toward said top wall, and said first and second walls cooperating with said sidewall to form a pair of channels sized to receive one of said first and second tongues of one of said connecting brackets.

11. The frame assembly of claim 10 wherein said first wall of said frame member is vertically spaced apart from said second wall of said frame member.

12. The frame assembly of claim 11 wherein said first and second walls are coaxially aligned with one another.

13. The frame assembly of claim 10 further comprising at least five frame members.

14. The frame assembly of claim 10 wherein each of said frame members is and formed from aluminum.

15. The frame assembly of claim 10 wherein said top wall of each of said frame members has a stepped configuration.

16. An aquarium comprising:
 a) a bottom wall, a top wall and at least three side ails joining said bottom wall to said top wall;
 b) first and second frame assemblies, said first frame assembly positioned adjacent to said top wall and said second frame assembly positioned adjacent to said bottom wall, each of said frame assemblies having at least three connecting brackets, each connecting bracket having a base with a first edge aligned at an angle to a second edge, a first member extending upward from said first edge and a second member extending upward from said second edge, said first and second members being integrally formed with said base and with each other, and each of said first and second members having a bottom, a top, a pair of sides and an end wall, a first tongue projecting outward from said end wall of said first member and being integrally formed therewith, said first tongue having a bottom wall, a top wall and a pair of sidewalls substantially coincident with said bottom, top and pair of sides of said first member, and said first tongue capable of engaging a first frame member, and a second tongue projecting outward from said end wall of said second member and being integrally formed therewith, said second tongue having a bottom wall, a top wall and a pair of sidewalls substantially coincident with said bottom, top and pair of sides of said second member, and said second tongue capable of engaging a second frame member, and at least three frame members each having a top wall; a sidewall and a bottom wall all joined together, and a first wall and a second wall spaced apart from said sidewall and aligned parallel thereto, said first wall joined to said top wall and extending toward said bottom wall and said second wall joined to said bottom wall and extending toward said top wall, and said first and second walls cooperating with said sidewall to form a pair of channels sized to receive one of said first and second tongues of one of said connecting brackets.

17. The aquarium of claim 16 wherein said top wall has a hinged door formed therein.

18. The aquarium of claim 16 wherein said top wall has an opening formed therein.

19. The aquarium of claim 16 wherein said aquarium has a polygon configuration with at least five sidewalls.

20. The aquarium of claim 19 wherein said aquarium has a hexagonal configuration.

\* \* \* \* \*